US009689989B2

(12) United States Patent
Trautenberg et al.

(10) Patent No.: US 9,689,989 B2
(45) Date of Patent: Jun. 27, 2017

(54) DETECTION OF FALSIFIED SIGNALS IN A SATELLITE NAVIGATION SYSTEM

(71) Applicant: Astrium GmbH, Taufkirchen (DE)

(72) Inventors: Hans Trautenberg, Cologne (DE); Johann Vilzmann, Rosenheim (DE)

(73) Assignee: Astrium GmbH, Taufkirchen (DE)

( * ) Notice: Subject to any disclaimer, the term of this patent is extended or adjusted under 35 U.S.C. 154(b) by 905 days.

(21) Appl. No.: 13/860,951

(22) Filed: Apr. 11, 2013

(65) Prior Publication Data
US 2013/0271316 A1    Oct. 17, 2013

(30) Foreign Application Priority Data

Apr. 12, 2012   (DE) .................. 10 2012 007 192

(51) Int. Cl.
*G01S 19/21*       (2010.01)
(52) U.S. Cl.
CPC .................. *G01S 19/215* (2013.01)
(58) Field of Classification Search
CPC .................................................. G01S 19/215
USPC ........................................ 342/357.58, 357.59
See application file for complete search history.

(56) References Cited

U.S. PATENT DOCUMENTS

| | | | | |
|---|---|---|---|---|
| 5,557,284 A * | 9/1996 | Hartman | ............... | G01S 19/215 342/352 |
| 6,496,778 B1 * | 12/2002 | Lin | ............... | G01S 19/215 342/357.31 |
| 7,450,060 B2 * | 11/2008 | Strachan | ............... | G01S 19/215 342/357.29 |
| 2003/0043086 A1 * | 3/2003 | Schaffner | ............... | H01Q 5/45 343/909 |
| 2007/0247362 A1 * | 10/2007 | Strachan | ............... | G01S 19/215 342/357.29 |
| 2011/0163913 A1 * | 7/2011 | Cohen | ............... | G01S 19/43 342/357.29 |
| 2012/0121087 A1 * | 5/2012 | Psiaki | ............... | G01S 19/05 380/255 |
| 2015/0070212 A1 * | 3/2015 | Smith | ............... | G01S 19/215 342/357.59 |

FOREIGN PATENT DOCUMENTS

WO    WO 2006/085976 A2    8/2006

OTHER PUBLICATIONS

European Search Report with partial English translation Dated Jun. 4, 2013 {Seven (7) Pages}.

* cited by examiner

*Primary Examiner* — Tashiana Adams
*Assistant Examiner* — Helena Seraydaryan
(74) *Attorney, Agent, or Firm* — Crowell & Moring LLP

(57) ABSTRACT

A device for detection of falsified signals in a satellite navigation system includes at least two antennas having one or more receivers for receiving navigation signals, a phase difference measuring unit for determining phase differences of the received navigation signals for each antenna, and a detection unit for detecting falsified navigation signals among the received navigation signals on the basis of the phase differences determined.

9 Claims, 2 Drawing Sheets

DETECTION OF FALSIFIED SIGNALS IN A SATELLITE NAVIGATION SYSTEM

CROSS-REFERENCE TO RELATED APPLICATIONS

This application claims priority under 35 U.S.C. §119 to German Patent Application No. 10 2012 007 192.2, filed Apr. 12, 2012, the entire disclosure of which is herein expressly incorporated by reference.

BACKGROUND AND SUMMARY OF THE INVENTION

Exemplary embodiments of the present invention relate to a device and a method for detection of falsified signals in a satellite navigation system, as well as a usage system for signals of a satellite navigation system.

In order to determine a position using a satellite navigation systems users rely on correct signals from the satellites (navigation signals). Correct signals contain the required and correct navigation messages, in particular those having integrity containing the ephemeris of satellites and transmission times as required for determining positions.

In satellite navigation systems currently in use, such as NAVSTAR GPS, satellite signals for civilian users are also transmitted without encryption, and thus it is possible to generate manipulated navigation signals near the ground. For example, falsified navigation signals can be generated and transmitted using pseudolites to prevent a correct position determination with such navigation systems. The manipulated navigation signals here are superimposed on the true signals emitted by the satellites and may contain formally valid but false navigation messages, i.e., falsified information for determination of position, i.e., location.

Transmitting falsified (and/or manipulated) navigation signals is known as "spoofing" because users often cannot differentiate the falsified signals from the true signals and thus correct navigation signals may be simulated for a receiver.

The following methods are known in particular as countervailing measures to spoofing (anti-spoofing):

Authentication of the navigation message: this type of authentication relates only to the navigation message but not to the signal. However, spoofers may provide their navigation signals with the true navigation message and thus calculate the pseudoranges accordingly.

Use of RAIM (receiver autonomous integrity monitoring) techniques in receivers of navigation signals (receiver-integrated logic): this makes it possible to detect one or more classified navigation signals but it does not enable detection of falsification of signals of a complete satellite constellation.

Observation of signal strength in receivers to identify spoofers based on a higher or fluctuating signal strength. This, however, is not very reliable because of the range of fluctuation in received signal strength that occurs even with true signals. Furthermore, it is not very difficult technologically to emit falsified navigation signals in a power range corresponding approximately to the power range of received satellite signals.

Use of directional antennas or multiple antennas with a known geometry, to detect the direction from which the navigation signals are emitted. For example, it is possible to use antennas that receive signals only from satellites above the receiver and suppress signals coming from near the ground. However, this requires an appropriate alignment of a receiver for navigation signals, so that the directional antennas are aimed in the direction of the satellites and not in the direction of the ground.

As explained above with regard to the known anti-spoofing measures, these measures have some rather great disadvantages in the detection of falsified signals. Accordingly, exemplary embodiments of the present invention are directed to an improved method of detection of falsified signals for a satellite navigation system.

In order to improve the detection of falsified signals in a satellite navigation system, the present invention involves receiving signals of a satellite navigation system with at least two antennas and one or more receivers and determining the phase differences of the received signals for each antenna. In the case of signals from satellites, the phase difference measurements on the individual antennas will yield different phase differences for the same satellite pairs. However, if the signals are emitted by a single source, then the phase differences between the individual signals at each antenna are low, in particular being almost identical. Thus signals emitted by a source can be detected. It is thus possible to detect an individual spoofing transmitter that is emitting multiple falsified navigation signals in a relatively reliable manner. The invention also does not require the technologically relatively complex determination of directions from which the navigation signals are coming by way of directional antennas. Instead, according to the present invention it sufficient to work on the basis of phase differences on the individual antennas, such that, for example, simple omnidirectional antennas may be used as the antennas. Furthermore, neither the distance nor the location of the individual antennas in relation to one another need be constant. Another advantage of the invention is that conventional commercial antennas and receivers for navigation signals that are suitable for determining phase differences may be used.

One embodiment of the invention relates to a device for detection of falsified signals of a satellite navigation system, comprising
at least two antennas having one or more receivers for receiving navigation signals,
a phase difference measuring unit for determining phase differences of the received navigation signals for each antenna, and
a detection unit for detecting falsified navigation signals among the received navigation signals on the basis of the phase differences detected.

Such a device may be at least partially integrated into chip sets for receivers for satellite navigation signals, for example, to be able to efficiently detect falsified navigation signals. The phase difference measuring unit may be integrated into the high frequency unit (RF stage), for example, and the detection unit may be integrated into the signal processor of a chip or chip sets for GNSS receivers.

The phase difference measuring unit may be designed to receive phase differences between the navigation signals received by each antenna based on carrier phase measurements.

Furthermore, a reference wave unit may be provided to generate a reference wave at the same frequency as the carrier wave of the received navigation signals, and the phase difference measuring unit may be designed to determine phase differences between the navigation signals received by each antenna on the basis of measurement of the phase differences between the carrier phases of individual navigation signals and the phase of the reference wave.

The detection unit may be designed to detect navigation signals as falsified navigation signals when the phase differences of these navigation signals are almost identical on each antenna.

The at least two antennas may be omnidirectional antennas.

Another embodiment of the invention relates to a usage system for signals of a satellite navigation system, comprising a device for detection of falsified signals in a satellite navigation system according to the invention, and a navigation signal processing unit for processing received navigation signals such that navigation signals recognized as falsified by the device are excluded from processing.

With such a usage system it is possible to efficiently prevent falsified navigation signals from interfering with or falsifying the position determination, which is particularly important in safety-critical applications for position determination such as in aircraft navigation.

Finally, one embodiment of the invention relates to a method for detection of falsified signals by a satellite navigation system comprising the following steps:

receiving navigation signals with at least two antennas with one or more receivers, determining phase differences of the received navigation signals for each antenna with a phase difference measuring unit, and detecting falsified navigation signals among the received navigation signals on the basis of the phase differences thereby detected by a detection unit.

Such a method may be implemented in a control program of a usage system for navigation signals in a satellite navigation system, for example, to able to detect falsified navigation signals and to exclude them from a position determination. It may also be integrated into navigation software, which is executed on a certain computer platform and is implemented for processing the navigation signals received.

According to this method, phase differences between the navigation signals received by each antenna can be determined by carrier phase measurements.

This method may also involve the following steps:

generating a reference wave at the same frequency as the carrier wave of the received navigation signals by a reference wave unit, and determining the phase differences between the navigation signals received by each antenna on the basis of measurements of the phase differences between the carrier frequencies of individual navigation signals and the phase of the reference wave.

In addition, this method can involve the following step:

detecting navigation signals as falsified navigation signals by the detection unit when the phase differences of these navigation signals on each antenna are almost identical.

Additional advantages and possible applications of the present invention are derived from the following description in conjunction with the exemplary embodiments depicted in the drawings.

The terms used in the list of reference numerals attached at the end and the respective reference numerals are used in the description, the claims, the abstract and the drawings.

BRIEF DESCRIPTION OF THE DRAWING FIGURES

DETAILED DESCRIPTION

Figure 1:
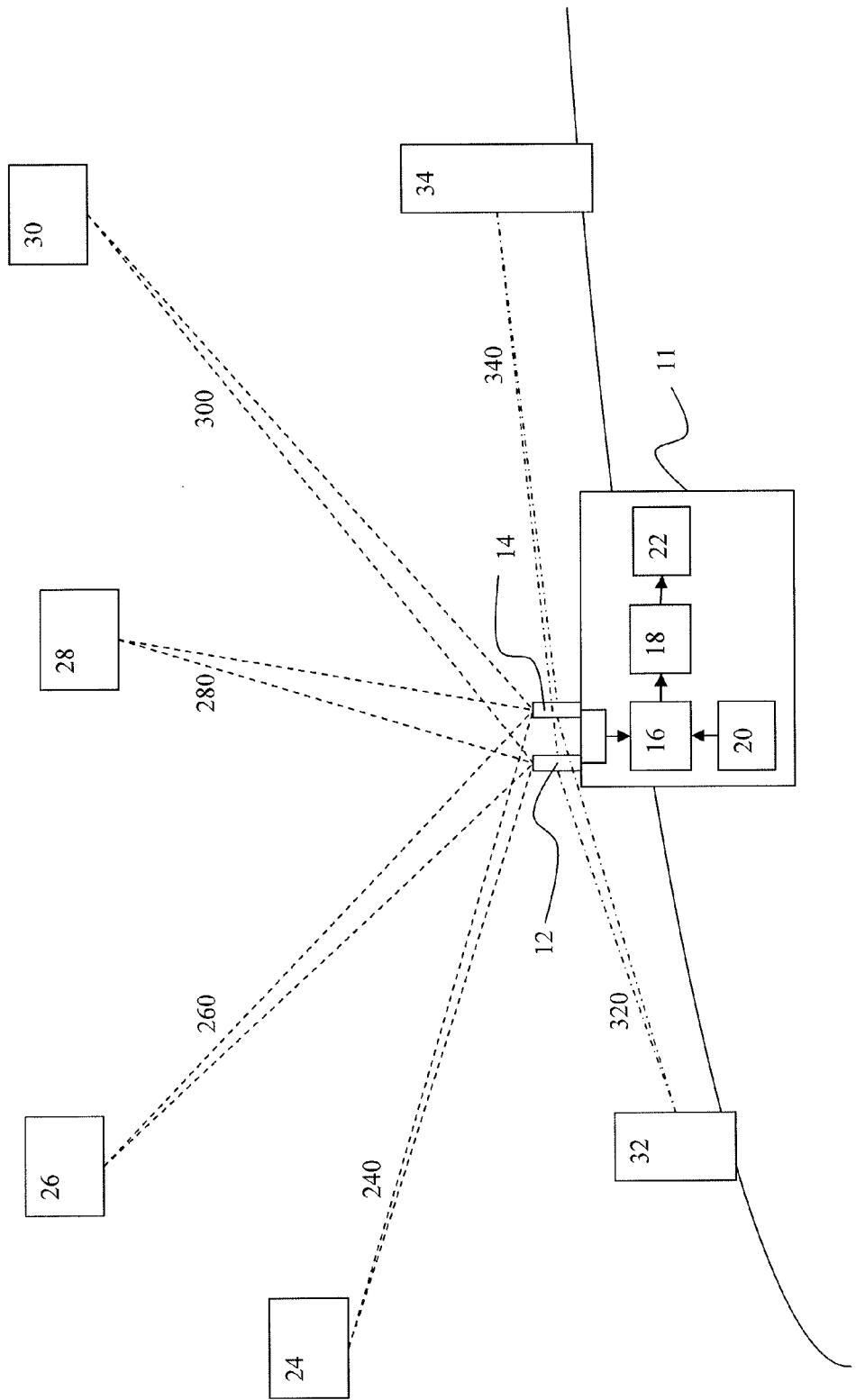
FIG. 1 shows a scenario in which one exemplary embodiment of a usage system for signals of a satellite navigation system according to the invention receives navigation signals from satellites as well as receiving falsified navigation signals from pseudolites near the ground.

In the following description, the same elements, functionally the same elements and functionally related elements are all provided with the same reference numerals. Absolute values are given below only as an example and are not to be understood as restricting the invention in any way.

The exemplary scenario shown in FIG. 1 involves a usage system 11 for a global satellite navigation system GNSS (global navigation satellite system) such as NAVSTAR GPS, GONASS or the planned European GNSS GALILEO on the surface of the earth.

Satellites 24, 26, 28 and 30 of the GNSS emit (navigation) signals 240, 260, 280 and/or 300 containing navigation messages of the GNSS. These navigation messages include ephemeris data on satellites, the transmission times of the signals, correction data, an almanac and similar data for the precise position and/or location determination of the usage system 10.

The navigation signals 240, 260, 280 and 300 are encrypted or unencrypted spread-coded signals, which are emitted, for example, with a carrier frequency in the range of 1.5 to 2 GHz by the satellites 24, 26, 28 and/or 30, respectively.

For generating the signals, each satellite has a high precision on-board clock, in particular an atomic clock. Ideally, the on-board clocks of satellites 24, 26, 28 and 30 will be synchronized. Each satellite has its own spread code (PRN (pseudo random noise) pulse train), which is known to the usage system 11, so that the latter can decode a signal received by one of the satellites. The navigation messages of a satellite transmitted with a signal are spread using the spread code of the satellite. The data stream thereby generated is modulated onto a carrier frequency signal, in particular by phase shift keying. The high frequency PSK-modulated signal thereby generated is emitted by the satellite via suitable antennas, in particular in the direction of the earth's surface.

The system 11 receives the signals 240, 260, 280 and 300 of the satellites 24, 26, 28 and/or 30 of the GNSS with two omnidirectional antennas 12 and 14. The received signals are then processed in the usage system 11 in an essentially known way and as described briefly below to receive the navigation messages contained in them.

The high frequency signal received from a satellite is converted from the high frequency (HF) range into an intermediate frequency (IF) range. To do so, a carrier wave is generated locally in the usage system. After conversion of the received signal to the IF range, the signal is detected by means of a code phase method, in which the spread code of the satellite, which is known to the usage system 11 and which was emitted by the signals, is used to generate a reference PRN pulse train, which correlates with the received signal that is converted to the IF range. When a successful correlation is detected, the navigation message contained in the received signal is decoded and further processed by a navigation signal processing unit 22.

Detection of falsified navigation signals by usage system 11 will now be described. Such falsified signals may be emitted by so-called spoofing pseudolites (pseudo satellites) 32 and 34, for example, which are located on or near the earth's surface. For example, a spoofing pseudolite may be designed as a mobile GNSS spoofing unit, which can also be transported by flying objects.

A spoofing pseudolite 32, 34 has an on-board clock, a unit for generating navigation messages that are formally valid but contain false data for the position determination and/or site determination of the usage system 10, and a signal generating unit for navigation signals. As in the case of the satellites 24, 26, 28 and 30 of the GNSS, the formally valid navigation messages are emitted with false data by the spoofing satellites 32 and/or 34 by means of navigation signals 320 and 340. The navigation signals 320 and 340 have the same carrier frequency as the navigation signals 240, 260, 280 and 300 of the satellites 24, 26, 28 and 30 and are therefore superimposed on these GNSS navigation signals. Valid spread codes of the satellites of the NGSS are used by the spoofing pseudolites 32 and 34 for spread coding, so that a usage system can process the received falsified navigation signals.

Each spoofing pseudolite 32 and 34 can emit multiple navigation signals of the GNSS; for example, each of the pseudolites 32 and 34 can falsify and emit all four navigation signals 240, 260, 280 and 300 of the satellites 24, 26, 28 and/or 30, or the pseudolite 32 may emit the navigation signals 240 and 260 of the two satellites 24 and/or 26 along with its navigation signals 340, and the pseudolite 34 may emit the navigation signals 280 and 300 of the two satellites 28 and/or 30 along with its navigation signals 340. A pseudolite will typically emit at least several falsified navigation signals so that a usage system cannot recognize through a plausibility check the falsified navigation signals of the pseudolite on the basis of additional satellite navigation signals.

In addition to the satellite navigation signals 240, 260, 280 and 300, the usage system 11 shown in FIG. 1 then also receives the falsified navigation signals 320 and 340 as well as the GNSS navigation signals 240, 260, 280 and 300 via the two antennas 12 and 14. The two antennas 12 and 14 are connected to a phase difference measuring unit 16.

The phase difference measuring unit 16 determines phase differences between the navigation signals received by each of the two antennas 12 and 14, i.e., for each of the antennas 12 and 14 the phase difference between the received signal instances of the navigation signals 240, 260, 280, 300 and the falsified navigation signals 320, 340. Phase differences can be determined by the phase difference measuring unit 16 by carrier phase measurements.

In the carrier phase measurement, the phase difference measuring unit 16 determines phase differences between the navigation signals 240, 260, 280, 300, 320, 340 received by each of the two antennas 12 and 14 on the basis of the phase of a reference wave generated in the usage system 10 by a reference wave unit 20, in particular a local stabilized quartz oscillator.

For the navigation signals 240 and 260 received via the first antenna 12, the phase difference thus determined is as follows:

$$\Delta\phi_{240,\ 260,\ 12} = (\phi_{carrier,\ 240,\ antenna\ 12} - \phi_{ref}) - (\phi_{carrier,\ 260,\ antenna\ 12} - \phi_{ref}),$$ where $\phi_{ref}$ indicates the phase angle of the reference wave, $\phi_{carrier,\ 240,\ antenna\ 12}$ indicate the phase angle of the carrier wave of the navigation signal 240 received via antenna 12 and $\phi_{carrier,\ 260,\ antenna\ 12}$ indicates the phase angle of the carrier wave of the navigation signal 260 received via antenna 12.

Accordingly, the phase difference determined for two falsified navigation signals 320_240 and 320_260 received via the first antenna 12 from the pseudolite 32 is calculated as follows:

$$\Delta\phi_{320\_240,\ 320\_260,\ 12} = (\phi_{carrier,\ 320\_240,\ antenna\ 12} - \phi_{ref}) - (\phi_{carrier,\ 320\_260,\ antenna\ 12} - \phi_{ref}),$$ where 320_240 and 320_260 indicate two different falsified navigation signals 240 and 260 of the satellites 24 and/or 26 emitted by the pseudolite 32; $\phi_{ref}$ indicates the phase angle of the reference wave; $\phi_{carrier,\ 320\_240,\ antenna\ 12}$ indicates the phase angle of the carrier wave of the falsified navigation signal 320_240 received via the antenna 12 and $\phi_{carrier,\ 320\_260,\ antenna\ 12}$ indicates the phase angle of the carrier wave of the navigation signal 320_260 received via antenna 12.

For each pair of navigation signals 240, 260, 280, 300, 320, 340 received via one of the two antennas 12 and 14, the phase difference $\Delta\phi$ is thus determined by the phase difference measuring unit 16 on the basis of measurements of the phase differences between the carrier phases of individual navigation signals and the phase of the reference wave, as described above as an example.

The phase differences $\Delta\phi$ thus determined are processed by a detection unit 18 connected to the phase difference measuring unit 16. Specifically, the detection unit 18 detects the navigation signals as falsified signals if their phase differences at each of the two antennas are almost identical because then there is a high probability that these signals originate from a single source, namely one of the spoofing pseudolites 32 or 34, while the signals from the satellite pairs, for example, satellites 24 and 30 generate definitely different phase differences at each of the antennas 12 and 14.

For the phase difference of the navigation signals 240 and 260 of the satellites 24 and/or 26, the navigation signals being received via the first antenna 12 and the second antenna 14, the following equation thus holds:

$$\Delta\phi_{240,260,12} \neq \Delta\phi_{240,260,14},$$

whereas the following holds for the phase difference in the falsified navigation signals 320_1 and 320_2 received from the spoofing pseudolite 32 via the first antenna 12 and the second antenna 14:

$$\Delta\phi_{320\_240,320\_260,12} \approx \Delta\phi_{320\_240,320\_260,14}$$

For recognition of navigation signals as falsified signals, the detection unit 18 can determine all approximately identical phase differences of signal pairs received at antennas 12 and 14, for example, by storing all the phase differences $\Delta\phi$ that have been determined in a table where they are sorted according to the best possible match and then characterizing the signal pairs having the best matching of phase differences on different antennas as being falsified.

Another detection option consists of the fact that the detection unit 18 subtracts the phase differences determined by the phase difference measuring unit 16 for each of the signal pairs received at each antenna 12 and 14, subtracting one from the other, and then comparing the difference thereby calculated (the difference in the phase differences) with a predetermined differential threshold value. The predetermined differential threshold value may be statistically determined. The predetermined differential threshold value may be selected as a function of a statistical mean of typical differences in phase differences between unfalsified navigation signals, in particular it may be selected to be lower than such a statistical mean. For example, the statistical mean of the phase difference of the navigation signals 240, 260, 280 and 300 may be determined over a longer measurement period and the predetermined differential threshold value may be selected to be somewhat lower than the statistical mean currently determined.

The detection unit 18 can then recognize navigation signals as being falsified if the differences in the phase differences of these navigation signal pairs are smaller than the predetermined differential threshold value, i.e., the following holds, for example $$|\Delta\phi_{320\_240,320\_260,12} - \Delta\phi_{320\_240,320\_260,14}| < \Delta\Delta\phi,$$

where $\Delta\Delta\phi$ denotes the differential threshold value.

The navigation signals that are detected as falsified by the detection unit 18 are output to a navigation signal processing unit 22, which processes all the received navigation signals and the navigation messages contained therein. The unit 22 may then exclude the navigation signals detected as falsified from the processing and/or may signal this to a user, for example, via a display device.

Figure 2:
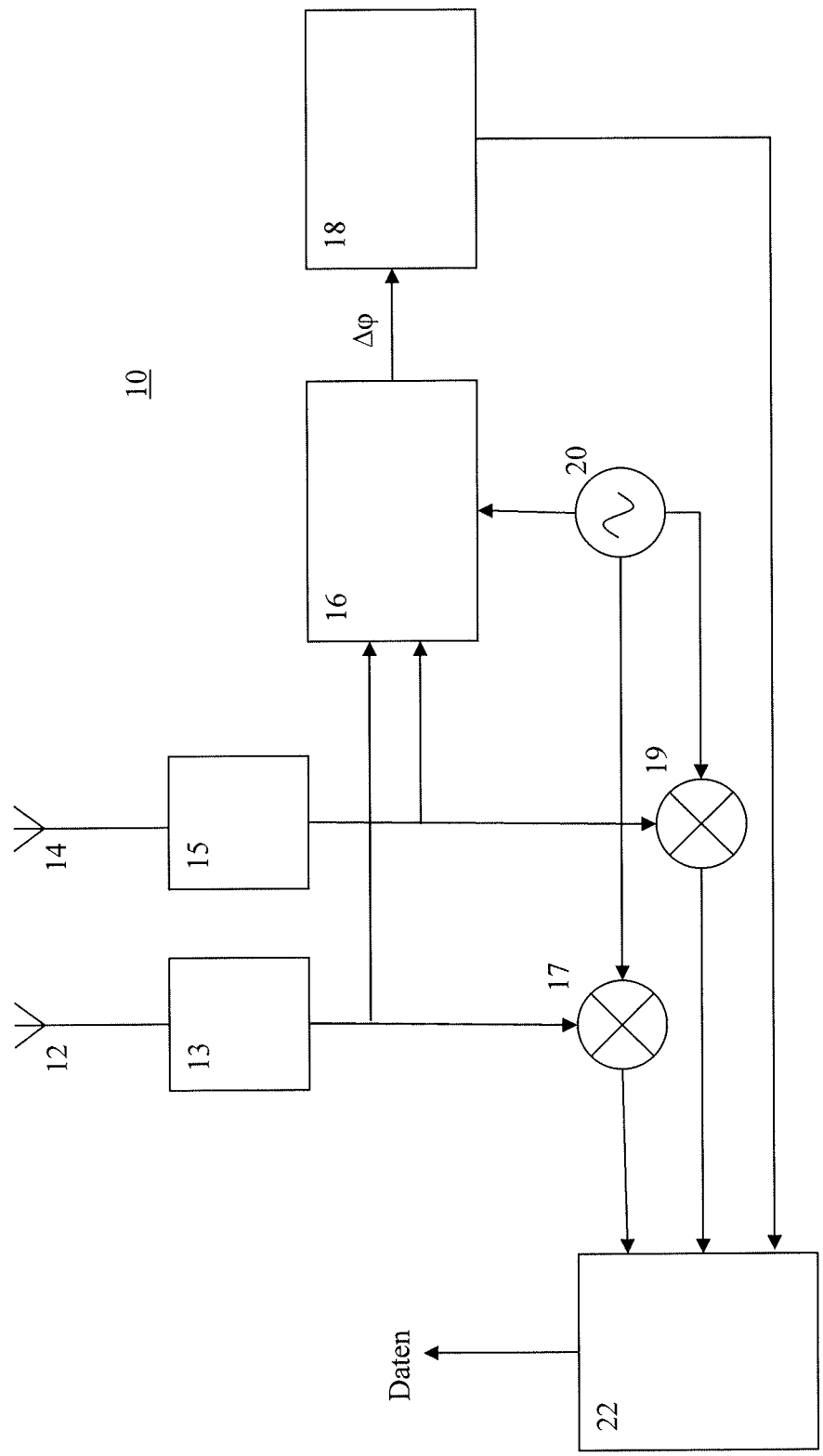
FIG. 2 shows a block diagram of an exemplary embodiment of a device for detection of falsified signals in a satellite navigation system according to the invention.

FIG. 2 shows a block diagram of an exemplary embodiment of the device according to the invention having a first and a second omnidirectional antenna 12 and/or 14. A first receiver 13, the second antenna 14 and a second receiver 15 are connected downstream from the first antenna 12. The two receivers 13 and 15 have a low-noise high-frequency amplifier in particular, which amplifies the received high-frequency navigation signals and/or carrier frequency signals. The amplified received signals are transformed to an IF range by a navigation signal processing unit 22 via a first mixer 17 and/or a second mixer 19. The signals transformed to the IF range are then processed by the navigation signals processing unit 22 in a known manner (in particular, correlation of the navigation signals with the spread codes of the satellite for decoding, extraction of the navigation messages from the decoded navigation signals). The navigation signal processing unit 22 outputs as the processing results the data of the navigation messages on the basis of which a controller can ascertain the actual position.

In parallel with the processing branch described above, the amplified received signals are sent to a phase difference measuring unit 16, which determines phase difference $\Delta\phi$ between the navigation signals received by each of the two antennas 12 and 14 on the basis of the phase of a reference wave generated by a reference wave unit 20.

The phase differences $\Delta\phi$ that are detected are transmitted to a detection unit 18 which recognizes falsified navigation signals on the basis of the phase differences $\Delta\phi$ and which outputs the identifiers for these signals to the navigation signal processing unit 22, so that this can exclude the navigation signals that have been recognized as falsified from the position determination and may optionally signal on a display screen of a usage system that falsified navigation signals have been detected at the current position of the usage system.

The present invention makes it possible to detect signals emitted by a source and thus to detect relatively reliably any single spoofing transmitter that emits multiple falsified navigation signals. In summary, it is possible with the present invention to achieve an improved detection of falsified signals in a satellite navigation system, in particular in comparison with known methods, some of which require a greater technical effort for detection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS AND ACRONYMS

10 device for detection of falsified signals in a satellite navigation system
11 usage system for signals of a satellite navigation system
12 first omnidirectional antenna
13 first receiver
14 second omnidirectional antenna
15 second receiver
16 phase difference measuring unit
17 first mixer
18 detection unit
19 second mixer
20 reference wave unit
22 navigation signal processing unit
24 satellite
26 satellite
28 satellite
30 satellite
32 spoofing pseudolite
34 spoofing pseudolite
240 satellite navigation signal
260 satellite navigation signal
280 satellite navigation signal
300 satellite navigation signal
320 falsified navigation signal
340 falsified navigation signal

What is claimed is:

1. A device for detection of falsified signals in a satellite navigation system, comprising:
   at least two antennas having one or more receivers for receiving navigation signals;
   a phase difference measuring unit configured to determine respective phase differences of the received navigation signals for each of the at least two antennas; and
   a detection unit configured to detect falsified navigation signals among the received navigation signals by comparing the determined phase differences,
   wherein the detection unit is configured to determine that the navigation signals are falsified navigation signals when the phase differences of the navigation signals of the at least two antennas are approximately identical.

2. The device according to claim 1, wherein the phase difference measuring unit is configured to determine the phase differences between the navigation signals received by the at least two antennas based on carrier phase measurements.

3. The device according to claim 2, further comprising:
   a reference wave unit configured to generate a reference wave with a same frequency as a carrier wave of the received navigation signals, the reference wave having a reference phase,
   wherein the phase difference measuring unit is configured to determine the phase differences between the navigation signals received by the at least two antennas on the basis of measurements of the phase differences between the carrier phases of individual navigation signals and the reference phase.

4. The device according to claim 1, wherein the at least two antennas are omnidirectional antennas.

5. A system that uses signals of a satellite navigation system, the system comprising:

a device comprising:
- at least two antennas having one or more receivers for receiving navigation signals;
- a phase difference measuring unit configured to determine respective phase differences of the received navigation signals for each of the at least two antennas; and
- a detection unit configured to detect falsified navigation signals among the received navigation signals by comparing the determined phase differences; and
- a navigation signal processing unit configured to process received navigation signals, such that navigation signals detected as falsified by the device are excluded from processing,
- wherein the detection unit is configured to determine that the navigation signals are falsified navigation signals when the phase differences of the navigation signals of the at least two antennas are approximately identical.

6. A method for detecting falsified signals in a satellite navigation system, the method comprising:
- receiving navigation signals via at least two antennas with one or more receivers;
- determining, by a phase difference measuring unit, respective phase differences of the received navigation signals for each of the at least two antennas; and
- determining, by a detection unit, that falsified navigation signals are among the received navigation signals by comparing the determined phase differences when the determined phase differences of the at least two antennas are approximately identical.

7. The method according to claim 6, wherein the phase differences between the navigation signals received by the at least two antennas are determined by carrier phase measurements.

8. The method according to claim 7, further comprising:
- generating, by a reference wave unit, a reference wave at a same frequency as a carrier wave of the received navigation signals, the reference wave having a reference phase; and
- determining the phase differences between the navigation signals received by the at least two antennas on the basis of measurements of the phase differences between the carrier phases of individual navigation signals and the reference phase.

9. The device according to claim 1, wherein a difference of the phase differences of the navigation signals is compared to a predetermined threshold value.

* * * * *